Figure 1:
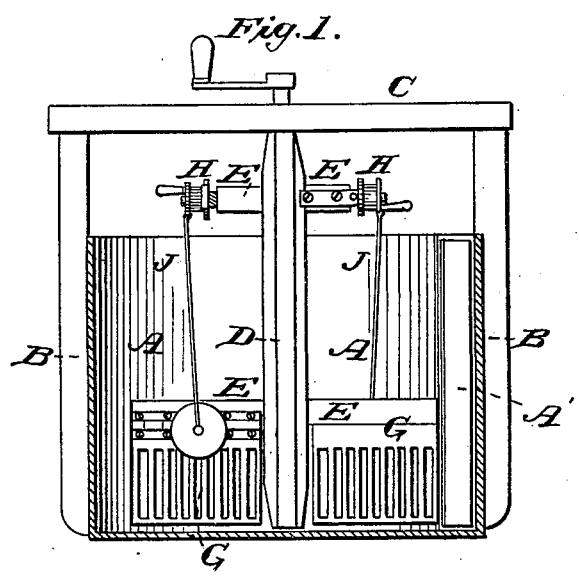
Figure 2:
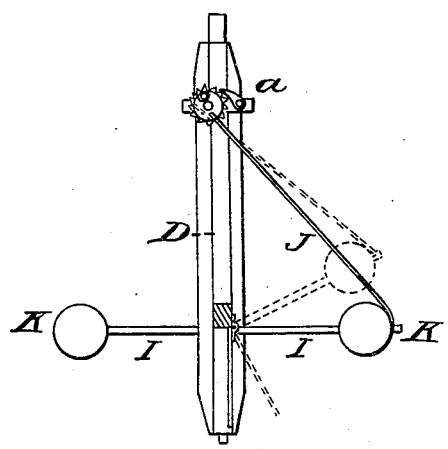

MASON & BRANT.
Starch Stirrer.

No. 68,374. Patented Sept. 3, 1867.

WITNESSES:

INVENTORS

United States Patent Office.

PURDY MASON AND JAMES W. BRANT, OF OSWEGO, NEW YORK.

Letters Patent No. 68,374, dated September 3, 1867.

---

IMPROVED MACHINE FOR STIRRING STARCH.

---

The Schedule referred to in these Letters Patent and making part of the same.

---

TO ALL WHOM IT MAY CONCERN:

Be it known that we, PURDY MASON and JAMES W. BRANT, of the city of Oswego, in the county of Oswego, and in the State of New York, have invented certain new and useful Improvements in Machine for Stirring Starch; and do hereby declare that the following is a full, clear, and exact description thereof, reference being had to the accompanying drawings, and to the letters of reference marked thereon. In the annexed drawings, making part of this specification—

A represents a tank, made of any suitable size, and provided at one side with a glass stave, A', or a long glass window, so that the contents of the tank may be visible to the operator. B B represent two uprights, which are erected on each side of the tank, and which are secured to it. C represents a cross-bar, which connects the upper ends of the uprights B B. D represents a vertical shaft, having one bearing in the bottom of the tank and the other in the cross-bar C. This shaft is provided with a handle, by means of which it is revolved, and also with two cross-bars, which form the arms E and F. Hinged to the arms F F are two gates, G G, and these gates have projecting from them at right angles two rods or bars I I, on the outer ends of which are weights K K. These arms, with weights attached, are for the purpose of keeping the gates closed when necessary. Upon the outer ends of the arms E E are two sleeves H, which have flanges at each end, and upon one of these flanges are formed ratchet-teeth. To the other or outer flange is secured a small handle for the purpose of turning or revolving these sleeves. A pawl, $a$, upon each arm, catches, when desirable, in the ratchet-teeth, for the purpose of stationing the collars or sleeves. A cord, J, passes from each sleeve to the outer ends of the rods or bars I I.

By revolving the sleeves H the cord is wound around them, and the outer ends of the bars I are raised. With the bars I, the gates of course are raised. When the gates G G hang in a vertical position, their bottoms almost reach the bottom of the tank. Sometimes the starch settles in the bottom of the tank, and when water is let in it is necessary to stir this up. The gates are then let loose, and the shaft D caused to revolve. The weights K cause the gates to press upon the starch and gradually to stir it up. The gates can be regulated for stirring the starch thoroughly in all of its different stages, and can be raised high enough to pass over it when it has settled. The weights K may be made of any desirable shape, and made to slide upon the bars I, with a set-screw to station them at any desired point.

Having thus fully described our invention, what we claim as new, and desire to secure by Letters Patent, is—

1. The tank A, with its glass stave or window, as and for the purpose set forth.

2. The use of the adjustable gates G G, with their weights and cords for regulating them, substantially as herein set forth.

3. The combination and arrangement of the tank A and shaft D, with its arms, with the sleeves H H, cords J J, and gates G G, as and for the purpose specified.

In testimony that we claim the foregoing we have hereunto set our hands and seals this 5th day of June, 1867.

PURDY MASON. [L. S.]
JAMES W. BRANT. [L. S.]

Witnesses:
A. MORGAN,
T. W. GOODSELL.